United States Patent [19]

Nutting

[11] Patent Number: 4,736,261
[45] Date of Patent: Apr. 5, 1988

[54] FULL FRAME RECIRCULATING IMAGING DEVICE HAVING A FIELD SEQUENTIAL OUTPUT

[75] Inventor: Thomas C. Nutting, Rochester, N.Y.

[73] Assignee: Eastman Kodak Company, Rochester, N.Y.

[21] Appl. No.: 764,468

[22] Filed: Aug. 12, 1985

[51] Int. Cl.$^4$ .................. H04N 5/78; H04N 3/15
[52] U.S. Cl. .................. 360/35.1; 360/33.1; 358/335; 358/906; 358/909; 358/213.26
[58] Field of Search ............... 358/335, 906, 909, 213, 358/152, 212, 213.22, 213.29, 213.26, 213.25; 360/35.1, 33.1; 357/24 LR, 30 L

[56] References Cited

U.S. PATENT DOCUMENTS

| | | | |
|---|---|---|---|
| 3,856,989 | 12/1974 | Weimer | 358/213 |
| 4,117,546 | 9/1978 | Anantha et al. | 365/233 |
| 4,263,623 | 4/1981 | Woo | 358/906 |
| 4,472,741 | 9/1984 | Takatsu et al. | 358/213 |
| 4,541,010 | 9/1985 | Alston | 358/906 |
| 4,553,167 | 11/1985 | Kinoshita | 358/213 |

FOREIGN PATENT DOCUMENTS 199280 10/1985 Japan ................ 358/213

OTHER PUBLICATIONS

Copending U.S. patent application Ser. No. 596,890, filed Apr. 5, 1984.

Primary Examiner—Alan Faber
Attorney, Agent, or Firm—David M. Woods

[57] ABSTRACT

A full frame solid state imager is disclosed having an input register utilized to effect field recirculation whereby the imager itself is utilized as a storage device to store the second field of the frame until the readout of the first field has been effected. The signal produced from the imager is a field sequential signal.

5 Claims, 4 Drawing Sheets

FULL FRAME RECIRCULATING IMAGING DEVICE HAVING A FIELD SEQUENTIAL OUTPUT

FIELD OF THE INVENTION

The present invention relates to solid state area imaging devices for use in electronic still cameras. More particularly, the invention relates to full frame solid state imagers having a field sequential output. (As discussed herein, "video" and "video signal" shall be taken to refer to the NTSC Standard, although the invention is applicable as well to other video standards.)

DESCRIPTION RELATIVE TO THE PRIOR ART

Conventional solid state imaging devices used in video cameras supply video information at the frame rate of 30 frames per second. Each frame is composed of two video fields apiece, each field occurring at the field rate of 60 fields per second. Such conventional solid state imaging devices produce a field sequential output by capturing the two fields ($f_1$ and $f_2$) of each frame in different successive sixtieths of a second.

While the above-described imaging devices produce satisfactory results when used in video cameras used to record motion pictures, problems occur when such devices are used to image still pictures, viz. in the event scene motion had occurred between successive fields (as is likely), then the subsequent display of that still frame will appear less sharp. This is because a still video picture is produced by repeatedly displaying a single video frame on a video monitor. If the two fields of the displayed frame are slightly different, the eyes of the viewer will integrate the two similar but different fields which destructively combine causing the still frame image to appear fuzzy.

Efforts to overcome the aforedescribed problem have resulted in the use of full frame imaging devices capable of capturing both fields of the frame siumltaneously. Copending Patent Application Ser. No. 596,890 discloses an apparatus employing a frame transfer type imaging device capable of simultaneous capture of both fields of a video frame.

The video signal produced from the disclosed apparatus is not field sequential, but instead is interleaved with lines from each of the two fields (i.e. one line from $f_1$, then one line from $f_2$, and so on). Additional signal processing circuitry (generally in the form of field store devices) is therefore required to separate the interleaved fields to produce a field sequential signal for, say, interlaced display on a video monitor. The problem then, which is the basis of the present invention, is to provide a full frame solid state imaging device having a field sequential output, thereby eliminating the need for any additional signal processing circuitry.

Other art which may be of interest in relation to the present invention may be found in U.S. Pat. Nos. 4,472,741 and 4,117,546.

SUMMARY OF THE INVENTION

In accordance with the present invention, a full frame imaging device is provided that produces a field sequential video signal, doing so by utilizing field recirculation to recirculate one of the video fields ($f_2$) back into the imaging device while the video signal representing the other field ($f_1$) is being generated. The imaging device itself is therefore used as a temporary field store for the second video field ($f_2$) while the video signal generation of the first field ($f_1$) is completed. The generation of the video signal representing the second field follows the completion of the first field to produce a field sequential output signal. Proper interlacing for display on a conventional video monitor is accomplished by utilizing a one half line time delay between the first and second field.

With the above as background, reference should now be had to the following figures for a detailed description of the invention.

DETAILED DESCRIPTION

Figure 1:
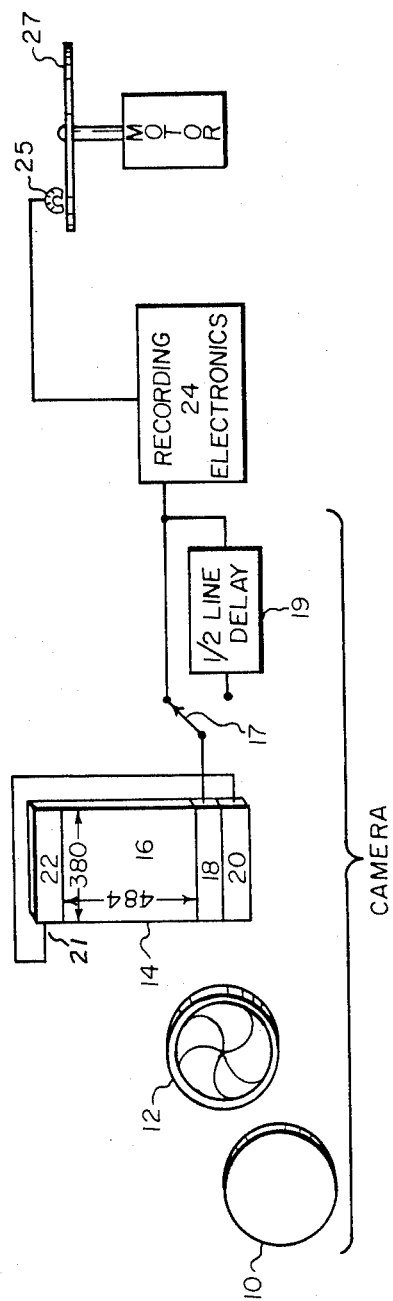
FIG. 1 is a perspective view, partially in block form, of one embodiment of the invention.

Referring to FIG. 1 of the drawing, a still image video camera is shown having a lens 10, a shutter 12, and a solid state imaging device 14. The imaging device 14 comprises an imaging area 16 having a two-dimensional array of photosensitive elements (pixels) arranged in 484 rows and 380 columns, two CCD parallel in/-serial out output registers 18 and 20, and one serial in/parallel out input register 22. The signal output line from the register 20 is connected to the input terminal 21 of register 22 and the signal output line from register 18 is connected to the signal input line of recording electronics 24. The recording electronics 24 are coupled to a recording head 25 that is used to record the still video image on magnetic disc 27. The imaging area 16 is identical in structure to the imaging areas of conventional frame transfer type imaging devices (see, for example, Charge Transfer Devices, Sequin and Tompsett, page 153, Library of Congress #63-12814 as representative of the state of the art). The registers 18, 20, and 22 are also commonly known CCD devices.

The imaging device 10 is exposed, by operation of the shutter 12, to scene-radiated light for the appropriate time interval. Each pixel in the imaging area 16 now contains a photocharge that is proportional to the magnitude of light incident on the pixel.

Turning to FIG. 2A, vertical clocking signals are applied to the imager 14 to shift the entire contents of the imaging area 16 downward by two lines. As can be seen, the even video line 484 is shifted into the register 20 and the odd line 483 is shifted into the register 18 (odd video lines compose the video field $f_1$ and even video lines compose the field $f_2$). Horizontal clocking signals are then applied to the registers 18, 20 and 22.

The contents of the register 18 are provided to the record electronics 24 while the contents of the register 20 are recirculated to the input register 22, as shown in FIG. 2B. When the transfer of line 484 into the register 22 is complete, a transfer pulse activates the parallel shift of the register 22 and line 484 is transferred back into the first line of the imaging area 16.

The clocking steps described in FIGS. 2A and 2B are repeated until the field $f_1$ (the odd video lines) has been transferred to the recording electronics 24 and the field $f_2$ (the even video lines) has been completely recirculated back into the imaging area 16, as shown in FIG. 2C.

After this, the video lines of the field $f_2$ physically occupy the odd line locations of the imaging area 16 so that on subsequent clocking cycles (repeat of cycles shown in FIGS. 2A and 2B), the video lines of the field $f_2$ will be transferred into the shift register 18 and subsequently to recording electronics 24 (FIG. 2D). The output signal produced from the imaging device 14, therefore, is field sequential.

Figure 2:
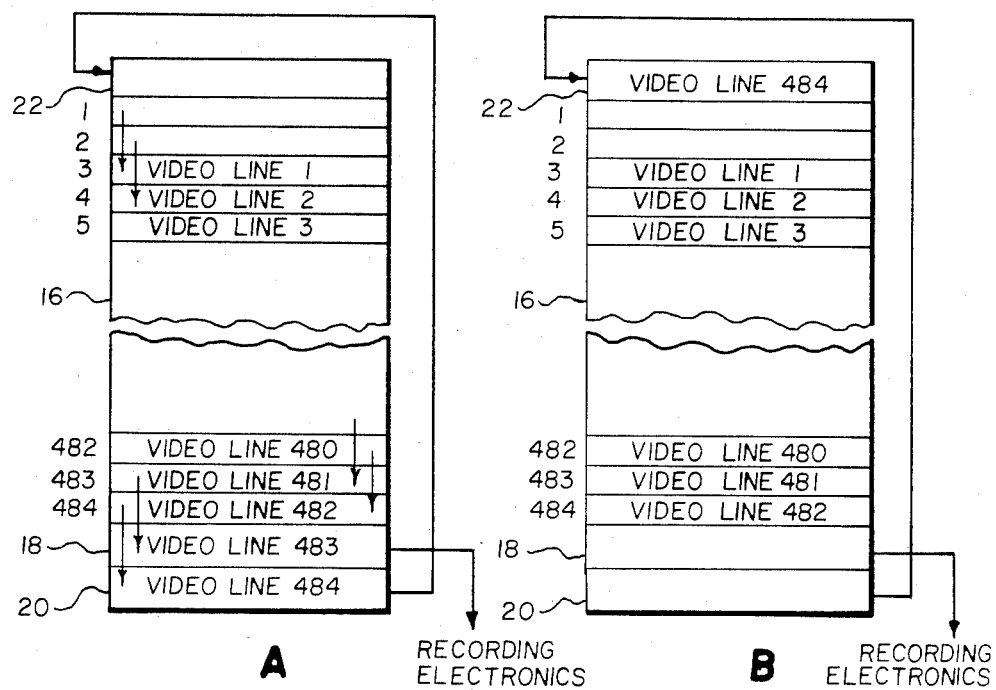
FIGS. 2A through 2D are diagrams of an imaging device embodying the present invention during various phases of operation.
Figure 2:
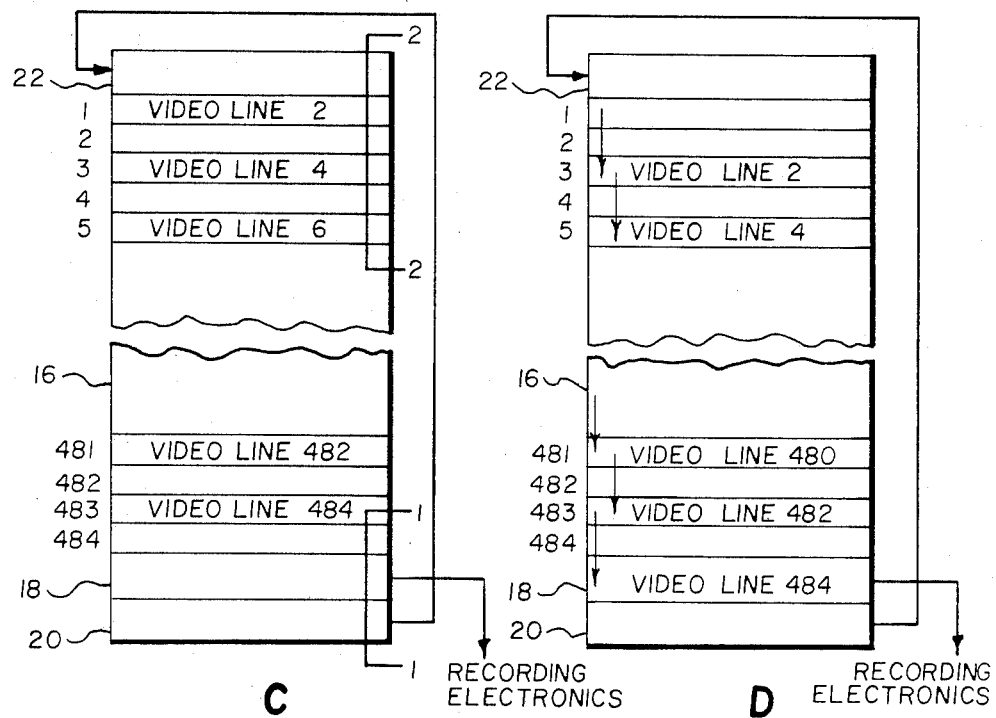

A detailed discussion of the clocking cycles will now be made with reference to FIG. 3, which represents a cross section of the imaging device 14 taken along the line 1—1 of FIG. 2 and shows a representation of the formation of "potential well" under the associated electrodes when a voltage is applied. The use of "potential well" profiles is well known in the art as a method of demonstrating the operation of a CCD device.

FIG. 3A represents the light integrating mode of the imaging device with the $\phi_2$, $\phi_3$ and $\phi_4$ electrodes activated. Light incident on the pixel generates a photocharge (represented by the "484" cross-hatched area) that accumulates at the electrode having the deepest potential well, i.e., the largest applied voltage. After the integration time is complete, the transfer gates electrodes $T_2$ and $T_3$ and the $\phi_1$ electrodes are activated while the $\phi_2$ electrodes are turned off as shown in FIG. 3B. With the potential barrier removed, the photocharge in the line 484 pixel is transferred to both shift registers 18 and 20. The photocharge from the line 483 pixel is advanced into the "484" location at the same time.

Referring to FIG. 3C, the $\phi_1$, $T_2$ and $\phi_3$ electrodes are deactivated and the $\phi_2$ electrode is activated. The $T_2$ transfer gate electrode is then deactivated (FIG. 3D) and all of the charge associated with video line 484 is fully transferred into the shift register 20. After the transfer of line 484 is complete, the $\phi_1$, $\phi_3$ and $T_2$ electrodes are activated and the $\phi_2$ electrode is deactivated causing the charge associated with line 483 to move into the shift register 16 (FIGS. 3E and 3F).

The vertical transfer cycle is completed by deactivating the $\phi_1$ and $T_2$ electrodes and activating the $\phi_2$ electrode (FIG. 3G). The charge associated with video lines 483 and 484 have now been transferred to their respective shift registers and the photocharge associated with the other video lines have been shifted by two storage locations in the imaging area 16.

The contents of the shift registers 18 and 20 are clocked out serially, the signal from the register 18 being supplied to the record electronics 24 and the signal from the register 20 being recirculated into the register 22. The register 22 now contains video line 484 (FIG. 4A) and a final vertical transfer is required to complete the recirculation cycle.

As shown in FIG. 4B, the $T_1$ electrode is activated to remove the potential barrier between the register 22 and the first pixel row of the imaging area 16. Referring to FIG. 4C, the $\phi_5$ electrode is deactivated and the charge is transferred from the register 22 to the first pixel row of the imaging area 16. The $T_1$ electrode is then activated to re-establish the potential barrier (FIG. 4D); and the $\phi_5$ electrode is reactivated (FIG. 4E). The photocharge representing line 484 has now been recirculated into the first pixel row of the imaging area 16.

Figure 3:
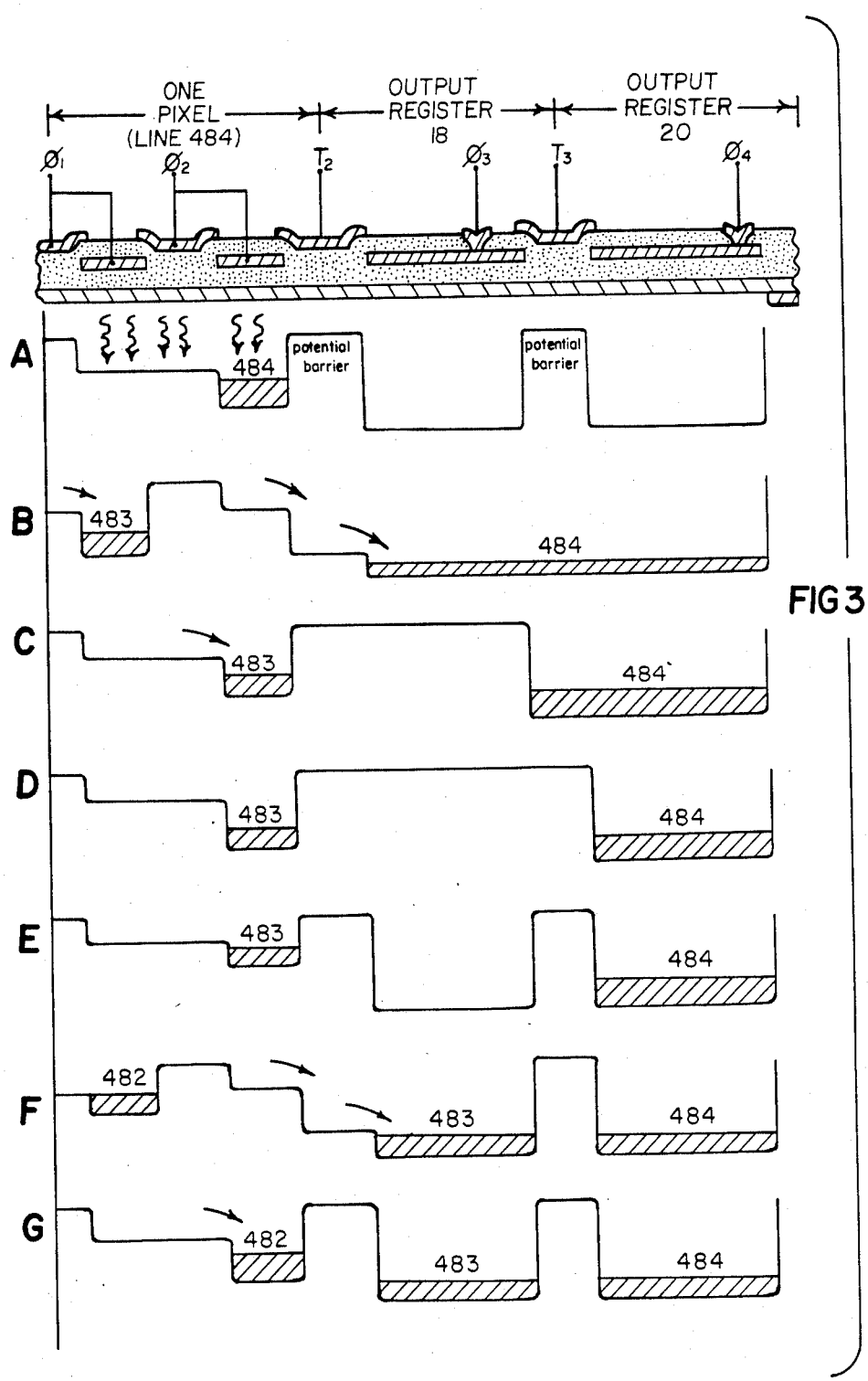
FIGS. 3A through 3G are representations of the "potential well" profiles of the device in FIG. 2C taken along the line 1—1.
Figure 4:
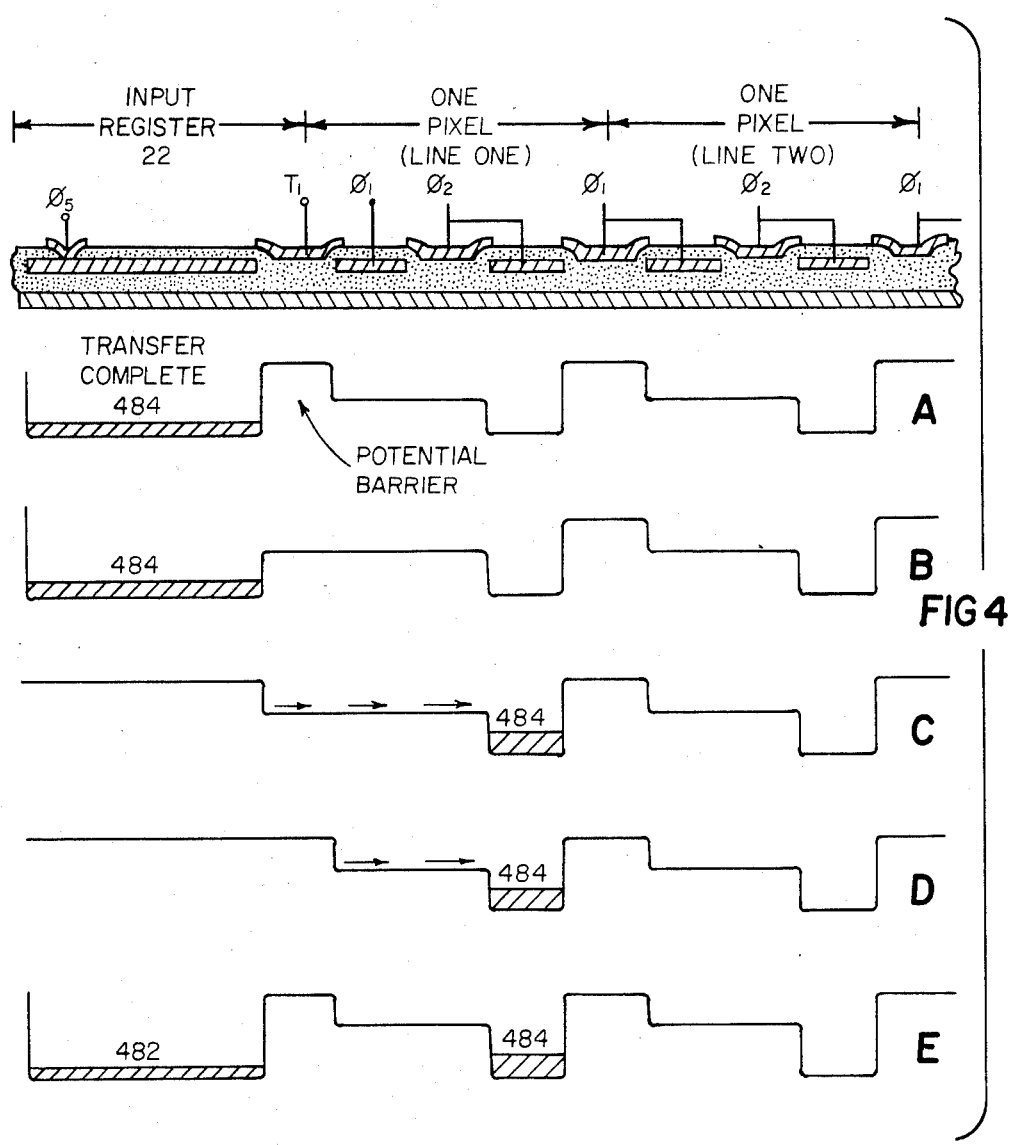
FIGS. 4A through 4E are representations of the "potential well" profiles of the device in FIG. 2C taken along the line 2—2.

The clocking cycles shown in FIG. 3 and FIG. 4 are repeated until all of field $f_2$ has been recirculated into the imaging area 16. A switch 17 and half line delay circuit 19 (refer to FIG. 1) are activated to provide for proper interlacing before the clocking cycles (shown in FIG. 3) are continued and the video lines from field 2 are transferred into and then out of the register 18.

The invention has been described in detail with particular reference to certain preferred embodiment thereof, but it wil be understood that variations and modifications can be effected within the spirit and scope of the invention.

What is claimed is:

1. An electronic still camera for recording successive fields of a video frame from a still exposure of two interlaced fields, said camera comprising:
    an imaging device having a two-dimensional array of photosensitive elements corresponding to a pair of interlaced fields;
    means for simultaneously exposing both fields of photosensitive elements to image light so that image charge information is generated in respective elements;
    first and second output means for storing adjacent lines of image information, each line belonging to a respective field;
    means for transferring adjacent lines of image information from said imaging device to said first and second output means;
    means for recirculating line information in said first output means to an input of said imaging device;
    record processing means including a record channel for processing image information from said imaging device; and
    means for providing line information in said second output means to said record processing means whereby the line information provided to the record channel constitutes successive fields of a still video frame.

2. A camera as claimed in claim 1 in which said first and second output means comprises a first CCD shift register coupled to receive the charge associated with even lines of said array and a second CCD shift register coupled to receive the charge associated with odd lines of said array.

3. A camera as claimed in claim 2 in which said imaging device includes a third CCD shift register coupled to receive the line information recirculated from said first output means and to transfer the received line information to said array.

4. A camera as claimed in claim 1 in which said record processing means includes a half-line delay that is inserted into the record channel for alternate fields.

5. A camera as claimed in claim 1 in which said imaging device and said output means are configured as an integral CCD structure.

* * * * *